Patented Nov. 26, 1935

2,022,093

UNITED STATES PATENT OFFICE 2,022,093

PROCESS FOR THE RECOVERY OF NON-SUGARS FROM SACCHARINE MATERIALS

Gustave T. Reich, Philadelphia, Pa.

No Drawing. Application July 14, 1932,
Serial No. 622,566

6 Claims. (Cl. 127—48)

This invention is a process for the recovery of non-sugars from various saccharine materials such as cane or beet sugar, and cane and beet and possibly other saccharine vegetable and fruit juices, the molasses, sugar waste, saccharified grain such as barley, corn or malt or other saccharine materials. These saccharine materials contain non-sugars that are valuable, especially the organic non-sugars such as gums and organic acids, and the potashes that are of great value in the arts. In recent years these non-sugars have become more valuable relatively than the sugar content of many such materials, and it became advantageous to secure these non-sugars in a pure state, leaving the saccharine materials, impure and adulterated. While the use of various alcohols, mixed with other materials has long been practiced for the purpose of obtaining pure or substantially pure saccharine solutions, from materials similar in character to these enumerated above, from which the sucrose subsequently might be recovered, these processes left the non-sugars and various adulterants mixed with the potashes and other non-sugars. The problem therefore before the applicant was to separate the potashes and other non-sugars in a substantially pure condition from the materials above mentioned, leaving the contaminations in the saccharine solution. This required a different treatment and the use of different alcohols from the methods and alcohols used where the adulterants were left with the non-sugars. In making researches for this purpose, I discovered various characteristics of different alcohols and their peculiar effects that enable me to reach my purpose of separating solutions of the different saccharine materials into layers, one of which will contain the potashes and other valuable non-sugars uncontaminated with adulterants and especially free from sucrose, which in the instant process is to be considered an impurity.

My instant invention is founded on the fact that iso-propyl alcohol, when used in treating such saccharine materials to salvage non-sugars acts entirely differently from other alcohols and that it may be used very advantageously in certain definite steps that are detailed hereafter, by the use of which it appears to operate with the best results, particularly that the ratio of the quantity of alcohol to the saccharine material and the concentration of the saccharine solution, and the dilution of the saccharine solution have particular effects, which I can utilize to obtain a layer in the saccharine solution that is composed of dissolved non-sugars remarkably free from pollution from sucrose, and also that I can secure the precipitation of various insoluble inorganic compounds.

I carry out my process by diluting the saccharine material until thoroughly liquid. I then add to this solution isopropyl alcohol. An insoluble precipitate is formed as I add the isopropyl alcohol. This precipitation starts at the time of the beginning of the adding of the isopropyl alcohol, when the concentration is 25%. This precipitate settles as additional isopropyl alcohol is added, and a precipitate consisting mainly of insoluble inorganic compounds, with a liquid layer above it forms in the dilute saccharine solution. The settled precipitate and the liquid layer may then be separated by decantation, centrifuging or other convenient methods.

I then add to the liquid layer more isopropyl alcohol, thereby causing its separation into two liquid layers that are separated easily. If the additional isopropyl alcohol added to the liquid is small in quantity, the upper layer will be high in sucrose and alcohols, and the lower layer will be high in non-sugars, but if a large amount of isopropyl alcohol is added the upper layer will consist of a solution of the non-sugars almost pure with free isopropyl alcohol, while the lower layer will contain the contaminated sugars.

The determination of the extent of the dilution of the saccharine material may be determined experimentally (that is in small amounts). The amount of isopropyl alcohol to be added to produce the precipitation and the deposit of the insoluble materials may also be determined experimentally. These amounts will be different, for the different materials. When these relations have been determined experimentally, they can be applied to the commercial practice of the process.

The layer containing the valuable non-sugars may then be dealcoholized and the valuable parts recovered. The other layers or layer often may be utilized although this is incidental. They or it will contain a substantial amount of non-sugars that contaminate it. The dealcoholizing is to purify the non-sugars and also to save the alcohol, to reuse it.

I will now give an example of my process used with molasses. 1,000 gallons of molasses may be diluted with 600 gallons of water. To this mixture may be added 400 gallons of isopropyl alcohol. This will precipitate most of the calcium salts and other inorganic compounds and the precipitate formed may be removed by centrifuging. To the clear liquid may be added an additional 400 to 3,000 gallons of isopropyl alcohol. The liquor then forms two layers and there may be also often a precipitation of sucrose. The layers of liquor may then be removed and may be separated. The upper layer contains sucrose and may be used over again, if quite dilute, or might be treated for the recovery of sucrose, after the removal of solvent; it might average about 1,000 to 3,000 gallons in volume. The lower layer may then be passed through a still preferably one which removes the isopropyl alcohol. The solvent-free residue, high in non-sugars, may then be used for the recovery of its various components. Or the addition of the solvent may be continued until the layers are inverted and the sugar containing layer be below and the non-sugar layer be positioned above it, and the latter may be passed through a still to remove the isopropyl alcohol, and if any sucrose or glucose adulterates the non-sugars, such adulterants may be washed out as above described.

I do not limit my invention by reading into it the details of the example above, nor do I confine it to the particular saccharine material molasses. The precipitation of the insoluble inorganic matters may be omitted where no such adulterant is contained, or when the insoluble inorganic adulterant will remain substantially completely with the saccharine layer when the sugars have been separated off from the layer containing the commercially valuable non-sugars. I therefore believe myself entitled to have the invention held as broad as the claims.

I claim:—

1. The process of recovering valuable non-sugars in a sufficiently refined condition for processing purposes from the class of saccharine materials consisting of molasses, malted grains, sugar wastes, sweet waters, and fruit juices, comprising diluting the saccharine materials to a liquid state, and adding to the solution isopropyl alcohol, until a separation of the solution into liquid layers occurs, one of which contains such sufficiently refined non-sugars.

2. The process of recovering valuable non-sugars from the class of saccharine materials consisting of molasses, malted grains, sugar wastes, sweet waters and fruit juices containing inorganic impurities, comprising diluting the saccharine material to a liquid state, adding to the solution isopropyl alcohol in sufficient quantity to precipitate the inorganic materials, then adding additional isopropyl alcohol to cause the solution to form into layers, one of which consists of pure non-sugars.

3. The process of recovering valuable non-sugars from the class of saccharine materials consisting of molasses, malted grains, sugar wastes, sweet waters and fruit juices, comprising diluting the saccharine material to a liquid state, adding to the solution isopropyl alcohol until a separation of the solution into layers occurs, one of the lower layers containing chiefly valuable non-sugars and the upper layers adulterated saccharine materials, then continuing the addition of isopropyl alcohol until the layers in the solution rearrange themselves with the layers containing the valuable non-sugars above the layers containing the adulterated saccharine materials.

4. The process of recovering valuable non-sugars in sufficiently refined form for processing from the class of saccharine materials, consisting of molasses, malted grains, sugar wastes, sweet waters, and fruit juices, comprising diluting the saccharine material to a liquid state, adding to the solution isopropyl alcohol, until a separation of the solution into layers occurs, adding additional isopropyl alcohol until the layers arrange themselves with an upper layer containing practically valuable non-sugars substantially free from sucrose, and containing an excess of isopropyl alcohol, separating off this layer from the remaining solution, expelling the isopropyl alcohol therefrom and recovering the same.

5. In a process for recovering valuable non-sugars from an aqueous liquid solution of saccharine materials of the group composed of molasses, sweet waters, cane and beet and fruit juices, molasses and sugar wastes, the step of adding to such a solution enough isopropyl alcohol to produce, in the solution, an upper liquid layer composed of substantially pure organic non-sugar compounds together with free isopropyl alcohol.

6. In a process for recovering valuable non-sugars from a liquid aqueous solution of saccharine materials of the group composed of malted grains, sweet waters, cane and beet juices, fruit juices containing sugars, molasses and sugar wastes, the steps of adding to the solution isopropyl alcohol until the inorganic impurities are precipitated, and then causing them to settle, decanting the liquid portion of the solution.

GUSTAVE T. REICH.